United States Patent [19] [11] Patent Number: 4,882,055
Stamstad [45] Date of Patent: Nov. 21, 1989

[54] UNITARY INJECTION MOLDED FILTER

[75] Inventor: Robert E. Stamstad, Poynette, Wis.

[73] Assignee: Suratco Products Company, Poynette, Wis.

[21] Appl. No.: 117,881

[22] Filed: Oct. 29, 1987

Related U.S. Application Data

[63] Continuation-in-part of Ser. No. 905,661, Sep. 11, 1986, abandoned.

[51] Int. Cl.$^4$ .............................................. B01D 25/02
[52] U.S. Cl. ................................. 210/483; 210/497.2; 210/497.3; 210/509; 55/521; 55/524; 55/DIG. 5; 264/DIG. 48; 264/DIG. 70; 264/328.14; 425/218; 425/235; 425/543; 425/547
[58] Field of Search .................. 210/446, 483, 497.01, 210/497.2, 497.3, 509; 425/243, 244, 218, 235, 542, 543, 547; 264/DIG. 48, DIG. 70, 328.14; 55/521, 524, DIG. 5

[56] References Cited

U.S. PATENT DOCUMENTS

| | | | |
|---|---|---|---|
| 3,731,815 | 5/1973 | Collingwood et al. | 210/496 |
| 3,746,595 | 7/1973 | Leason | 156/245 |
| 3,762,564 | 10/1973 | Weedon et al. | 210/466 |
| 4,052,315 | 10/1977 | Lindsay, Jr. et al. | 264/DIG. 48 |
| 4,113,627 | 9/1978 | Leason | 210/446 |
| 4,130,622 | 12/1978 | Pawlak | 264/255 |
| 4,138,303 | 2/1979 | Taylor | 210/499 |
| 4,253,959 | 3/1981 | Tafara | 210/232 |
| 4,287,066 | 9/1981 | Greutert et al. | 210/464 |
| 4,287,067 | 9/1981 | Dyner | 210/487 |
| 4,303,609 | 12/1981 | Hureau et al. | 264/504 |
| 4,388,191 | 6/1983 | Morgan | 210/452 |
| 4,389,425 | 6/1983 | Tafara et al. | 210/232 |
| 4,400,277 | 8/1983 | Leason | 210/441 |
| 4,406,326 | 9/1983 | Wagner | 166/227 |
| 4,414,172 | 11/1983 | Leason | 264/255 |
| 4,490,253 | 12/1984 | Tafara | 210/238 |
| 4,495,072 | 1/1985 | Fields | 210/238 |
| 4,547,190 | 10/1985 | Leason | 604/185 |
| 4,608,166 | 8/1986 | Cain | 210/232 |

FOREIGN PATENT DOCUMENTS 693883 9/1964 Canada.
53-104473 2/1977 Japan.
5434475 8/1977 Japan.

Primary Examiner—W. Gary Jones
Assistant Examiner—Wanda L. Millard
Attorney, Agent, or Firm—Lathrop & Clark

[57] ABSTRACT

A unitary injection molded filter is disclosed which includes a rigid frame of resin material to provide a rigid shape to the filter, and at least one screen of non-woven sheet resin material suspended on the frame and having formed therethrough a plurality of holes extending between the opposed side surfaces of the screen so as to form fluid passages therethrough. Each screen is integrally molded simultaneously with the frame.

20 Claims, 3 Drawing Sheets

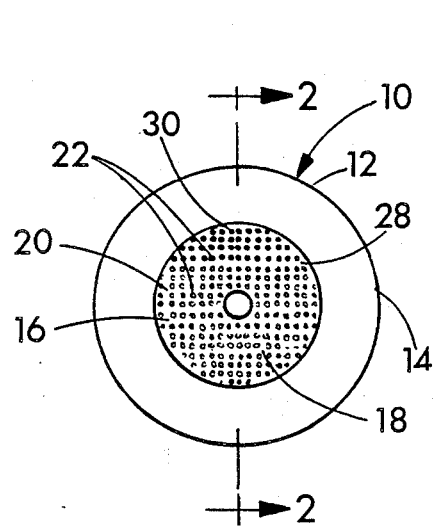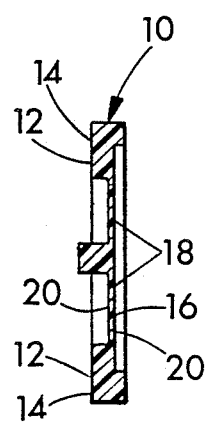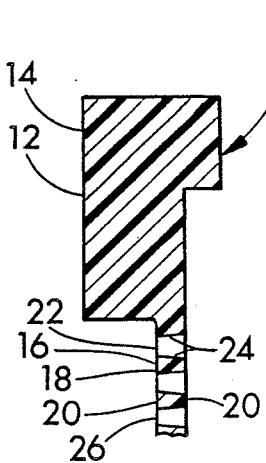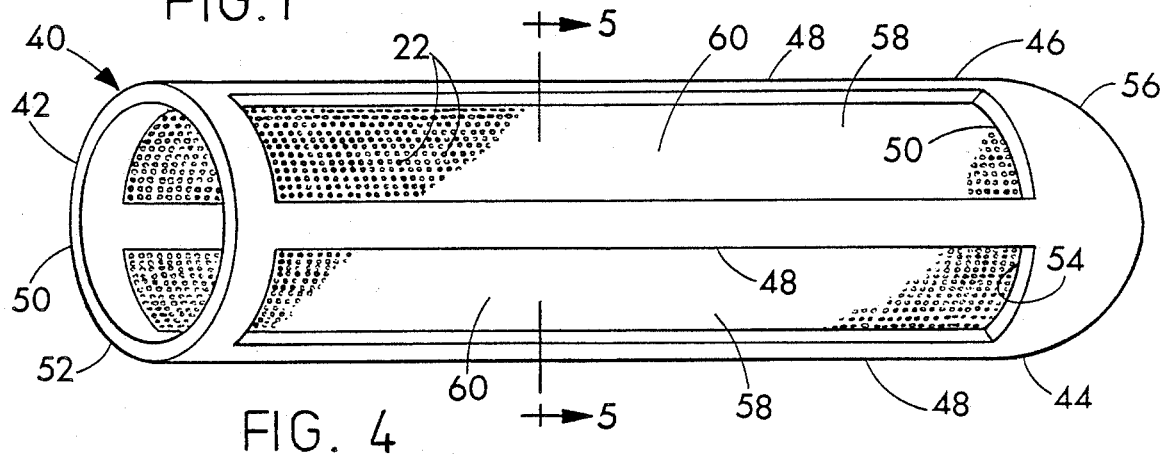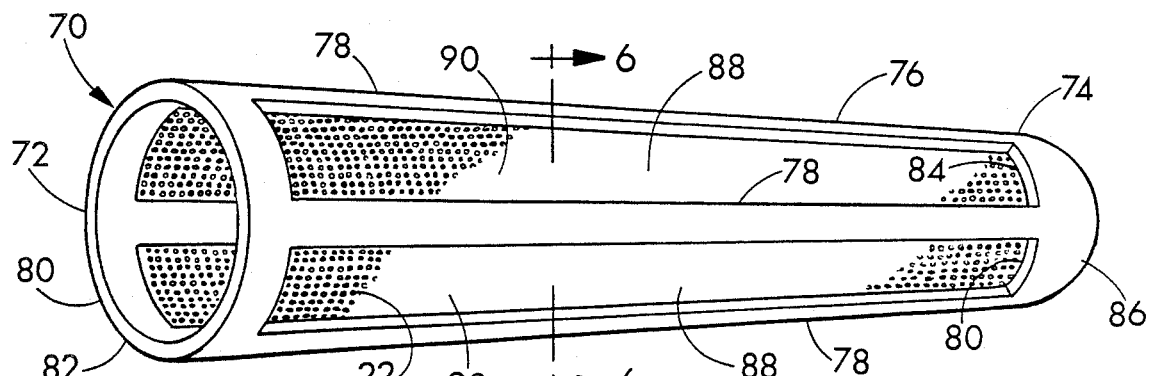

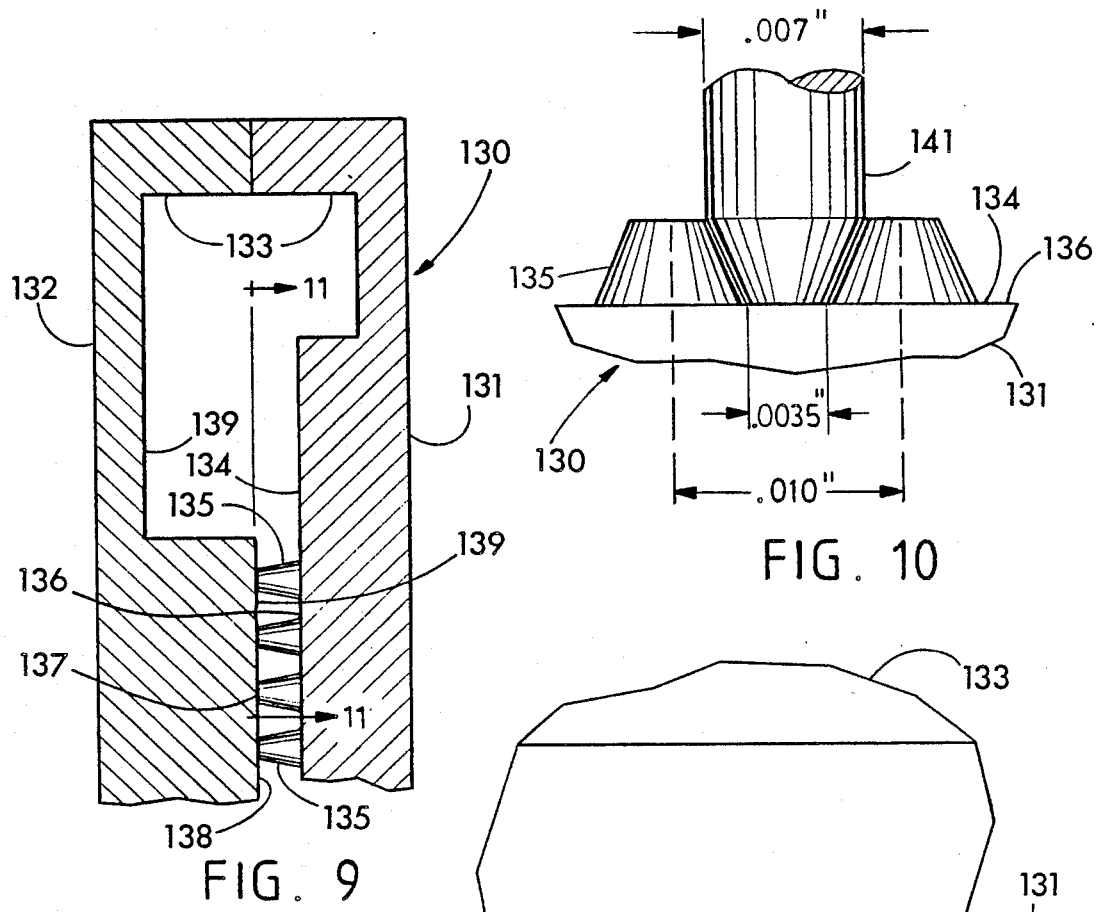
FIG. 9
FIG. 10
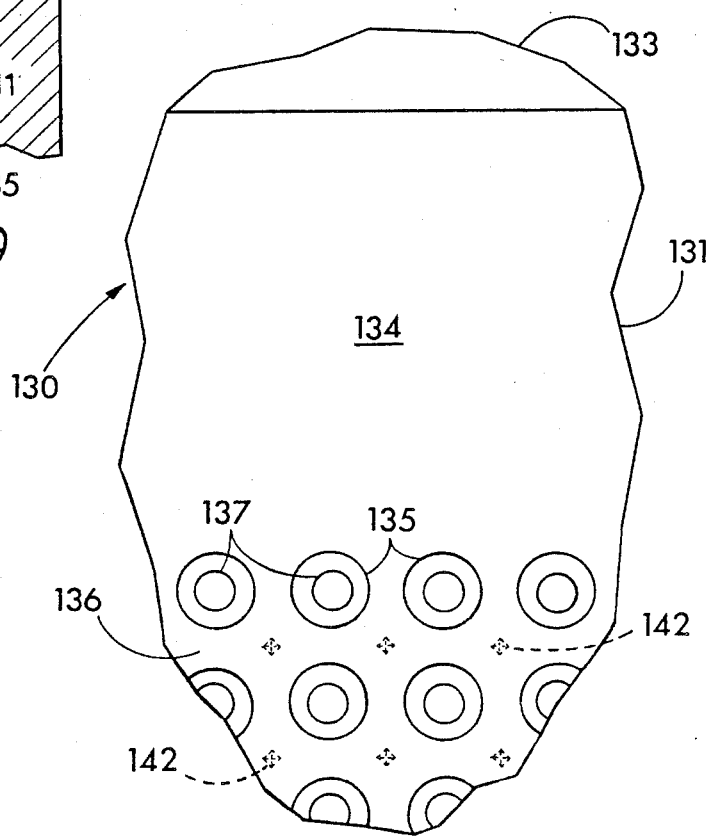
FIG. 11

UNITARY INJECTION MOLDED FILTER

BACKGROUND OF THE INVENTION

1. Field of the Invention

The present invention relates to molded plastic fluid filters, particularly those which have a rigid frame and a sheet material extended between the members of the frame, the sheet material having holes to allow fluid passage while filtering solids out.

2. Description of the Prior Art

Various types of filters are used for removing particles of solid or semi-solid matter which are greater than a selected size from fluids which must be maintained at a certain degree of purity or quality. Small filters commonly used for separating smaller solid particles from fluids are often formed of a rigid frame and screens, formed from another type of material, then are stretched on the rigid frame. The screen in these types of filters usually consist of woven materials. The threads in a woven filter screen can shift to create varying hole sizes, which is not desirable. Generally woven materials for filter screens must also have a seam where the material is joined to itself or overlapped. To join the frame and screen together, most commonly the sheet of screen material is inserted into the mold in which the frame is molded. This makes conventional filters complex to manufacture because of the need for precision placement of the screen material in the mold with the seam properly located so that the molded frame will support it. Other types of filters have been formed from plastic mesh material which is first molded into substantially flat sheets having slots or holes therein, and then are rolled to form a cylinder having a seam where the two ends of the sheet are joined. Such a filter is disclosed in U.S. Pat. No. 4,406,326 to Wagner. The Wagner filter is produced by injection molding a sheet having a large plurality of V-shaped slots, then roll-forming the sheet into a cylindrical shape, and then finally bonding its longitudinal edges together.

One type of filter is known which has been molded by a single step process. U.S. Pat. No. 4,052,315 to Lindsay Jr., et al. discloses a one piece molded fluid filter having a base portion with fluid passageway therethrough, a head portion spaced axially from the base a selected distance, a plurality of axially spaced apart annular rings positioned between the base portion and the head portion, a plurality of arcuately spaced axially disposed ribs extending between the base and head portions and extending solely in a direction radially inward from an internal juncture of the radially outer edges of the ribs so that the ribs and annular rings cooperate to provide a multiplicity of predetermined size filtration openings at the junctures between the ribs and rings. The fluid passageway in the Lindsay filter are formed by the junctures of the annular rings and axially disposed ribs, and not by holes through a screen material. Some of the ribs and rings do form a frame structure in the Lindsay filter, however, the remaining ribs and rings could not be said to form a screen material with holes therethrough.

Engraving equipment, such as a computer controlled orbiting cutter, has been used in the past to create decorative designs and indicia on molds which are used in the manufacture of plastic products. A resist and photo etching process has also been used to engrave decorative designs on these molds.

SUMMARY OF INVENTION

The present invention is summarized in that a unitary injection molded filter includes a rigid frame of resin material to provide a rigid shape to the filter, and at least one screen of non-woven sheet resin material suspended on the frame and having formed therethrough a plurality of holes extending between the opposed side surfaces of the sheet so as to form fluid passages therethrough. Each passage has a minimum transverse width within the range of 0.0005 inches to 0.01 inches. The screens are integrally and simultaneously molded with the frame with a one-step injection molding process. Generally, each hole in the screen will be defined by a wall which is continuously axially tapered inwardly from one side surface to the other side surface of the screen. The tapered holes make it easier to remove portions of the mold, which have projections for the formation of the holes, from the filter after it is formed.

A primary object of the invention is to provide a one-piece unitary filter for separating solid particles out of fluids.

A second object of the invention is to provide an injection molded synthetic resin fluid filter with at least one screen of non-woven sheet resin material suspended on a frame, the screen and frame both being integrally formed at same time as a unitary filter.

An additional object of the invention is to provide a unitary injection molded filter in which the frame and screen are simultaneously molded together.

A further object of the invention is to provide a unitary injection molded filter which may be easily and efficiently molded into various shapes and sizes. Another object of the invention is to provide a unitary injection molded resin fluid filter which is capable of separating very small solid particles from liquids.

A further objective is to provide a filter with a smooth surface inside and out.

Other objects, features, and advantages of the invention will be apparent from the following detailed description taken in conjunction with the accompanying drawings wherein a preferred embodiment of the invention has been selected for exemplification.

BRIEF DESCRIPTION OF THE DRAWINGS

FIG. 1 is a plan view of the first embodiment of the unitary injection molded filter, which is substantially flat.

FIG. 2 is a section view taken along section line 2—2 of FIG. 1.

FIG. 3 is a magnified view of the screen of FIG. 2 showing the holes therein.

FIG. 4 is a perspective view of a second preferred unitary injection molded filter, which is substantially cylindrical.

FIG. 6 is a perspective view of the third preferred unitary injection molded filter, which is longitudinally tapered.

FIG. 9 is a partial enlarged section view of a mold used to form the filter which is shown partially in FIG. 3.

FIG. 10 shows an orbiting cutter tool cutting between two projections on a mold for forming the filter.

FIG. 11 is a magnified partial view taken along reference line 11—11 of FIG. 9.

DESCRIPTION OF THE PREFERRED EMBODIMENTS

Figure 8:
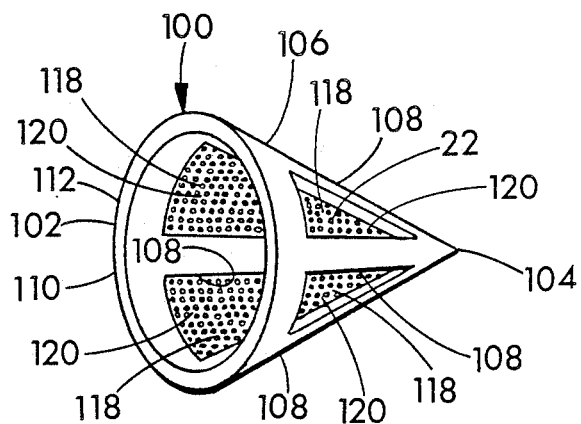
FIG. 8 is a perspective view of a fourth preferred unitary injection molded filter which has a funnel shape.

Referring more particularly to the drawings wherein like numbers refer to like parts, FIG. 1 shows a first embodiment of a unitary injection molded resin fluid filter constructed in accordance with the present invention in plan view. The word unitary as used herein is defined as a continuous, homogeneous mass formed by a single injection of thermoplastic resin material. FIGS. 4, 6, and 8 respectively show second, third, and fourth preferred embodiments of a unitary injection molded filter of the present invention in perspective view.

The first preferred embodiment of the molded filter 10, shown in FIGS. 1-3, includes a rigid frame 12 of synthetic thermoplastic resin material which provides a rigid shape to the filter 10 in the form of an annulus 14. The filter 10 further includes a single screen of non-woven sheet of the same synthetic thermoplastic resin material suspended within the annular frame 12 and integrally molded with it. The screen 16 has two opposed side surfaces 20. The two side surfaces 20 are essentially flat planar, smooth surfaces. A plurality of holes 22 extend between the side surfaces to form fluid passages therethrough as shown most clearly in FIG. 3. In the filter 10, each hole 22 has an inside wall 24 which is continuously tapered inwardly from one side surface 20 to the other side surface 20 of the screen 16. The tapered end 26 of each hole 22 is defined as that end of the hole 22 which is narrowest. It has been found that such unitary molded filters, such as that illustrated by the filter 10, can be efficiently and easily molded with holes 22 and which each have a minimum transverse width within the range of 0.0005 to 0.01 inches. Other hole shapes are also possible. This type of filter 10, therefore, is particularly adapted for separating very small solid particulate matter from a fluid. The holes 22 are arranged in parallel rows 28 and parallel columns 30 within the screen 16. Each hole 22 of the preferred first filter 10 has a center which is separated by a distance of 0.010 inches from the center of adjacent holes 22. However, alternate unitary injection molded filters may have holes 22 of varying sizes, shapes and patterns than that disclosed in the preferred filter. Additionally, the rigid frame 12 may vary in size and shape as well.

The unitary molded filter 10 is injection molded in a hardened steel mold 130 including two parts 131 and 132 as shown in FIG. 9. The construction of the mold cavity surfaces 133 for the frame 12 are conventional. One part 131 of the mold 130 has tapered projections 135 which are preferably frusto-conical in shape and which project from an otherwise continuous surface 136. The projections 135 are machined on the mold part 131, conforming in shape to the holes 22. The projections 135 in the mold cavity surface 134 have flattened tops 137 to abut the continuous surface 138 on the mold surface 139 of the opposing mold part 140. As shown in FIG. 9, the continuous surface 138 in this embodiment is planar.

The projections 135 are preferably created by using standard engraving equipment or processes, such as the computer controlled orbiting cutter, or a resist and photo-etching process. This equipment and these processes, while conventional to engravers for creating intricate decorative designs and indicia on molds, is not known to have previously been employed to machine mold structure for forming fine openings in molded parts which can function as screens for removing very small particulate matter from fluids. FIGS. 10 and 11 demonstrate how the tool 141 of such an orbiting cutter "orbits" in a circle cutting out each projection 135. After each projection 135 has been cut in a circular pattern, quasi-diamond shaped lands 142 may remain as shown in dashed lines in FIG. 11. The orbiting cutter is programmed so that the tool 141 returns to remove these lands 142. Orbital cutters used for engraving currently are able to cut out projections 135 having flattened tops 137 as small as 0.0005 inches in transverse width. Conventional tool and die techniques are known to be able to create projections with flattened tops as small as about 1/32 inch. Since the filter screens and frame are to be integrally and simultaneously formed, the spaces within the mold 130 for the frame and screen must be interconnected. This interconnection allows the entire mold 130 to be filled with the synthetic resin material from one port. In molding the filter, the synthetic resin material should be injected very quickly so as to fill the entire mold without premature hardening of the resin material which will prevent complete filling of the mold cavity. In forming the filter shown in FIG. 3, injection of the synthetic resin material should be completed within about 0.2 seconds.

Three other embodiments of unitary molded filters are shown in FIGS. 4, 6, and 8. These filters are shown in FIGS. 4, 6, and 8 by way of illustration and are not intended to limit the present invention. The filters shown in FIGS. 4, 6, and 8 have screens similarly formed from non-woven sheet synthetic thermoplastic resin material as that of the first preferred filter 10 shown in FIGS. 1, 2, and 3.

Figure 5:
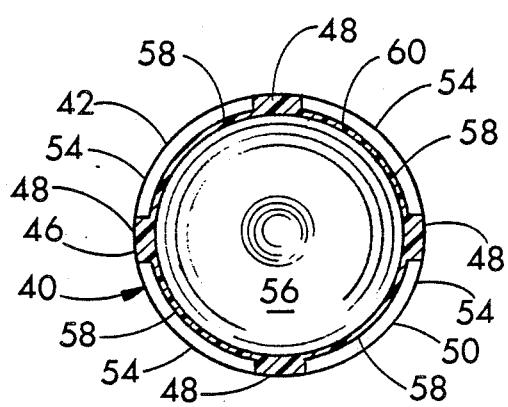
FIG. 5 is a section view taken along section line 5—5 of FIG. 4.

The second preferred unitary injection molded filter 40 shown in FIG. 4 and 5 is substantially cylindrical in shape with a proximal end 42 and a distal end 44. The frame 46 includes four longitudinal ribs 48 which are parallel to a filter axis, and two circumferential ribs 50, one of which is a proximal end rib 52 at the proximal end 42 of the filter, and another of which is a distal end rib 54 at the distal end 44 of the filter 40. The frame 46 further includes a distal endcap 56 which is integrally molded with the distal end rib 54 so that the distal end 44 of the filter 40 is closed off. The filter 40 further includes four screens of non-woven sheet resin material which are suspended within the frame and integrally molded with the frame 46. The four longitudinal ribs 48 are spaced 90° apart so that each screen 58 substantially forms a quarter section 60 of a cylinder suspended between the ribs 48 and 50. As stated above, each screen 58 within the filter 40 has much the same characteristics as the screen 16 in the first filter 10.

Figure 7:
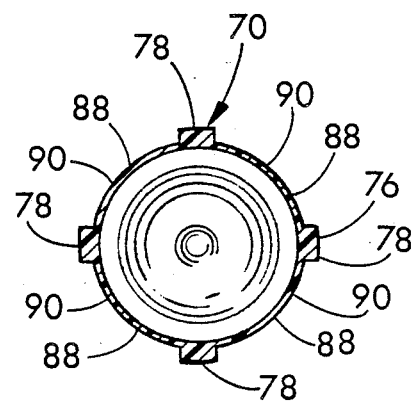
FIG. 7 is a section view taken along section line 7—7 of FIG. 6.

As shown in FIGS. 6 and 7, the third preferred unitary injection molded filter 70 has a substantially frusto-conical shape, narrowing from a proximal end 72 to a distal end 74. The filter 70 has a frame which includes four longintudinal ribs 76 which are spaced 90° apart and are individually coplanar with the filter axis, and two circumferential ribs 78. One of these circumferential ribs 80 is a proximal end rib 82 at the proximal end 72 of the filter 70, and another circumferential rib 80 is a distal end rib 84 near the distal end 74 of the filter 76. The frame 76 further includes a distal endcap 86 which is integrally molded with the distal end rib 84 so that the distal end 74 of the filter 70 is closed off. The filter 70 further includes four screens 88 of non-woven sheet resin material suspended it between and molded integrally to circumferential ribs 80 and the longitudinal ribs 78. Each screen 58 substantially forms a quarter-section 90 of a truncated cone. Again, the screens 88 in the filter 70 have the same qualities as those outlined in the description of the first preferred filter 10.

As shown in FIG. 8 the fourth preferred unitary injection molded filter 100 is formed in the shape of a cone. The filter 100 narrows from a proximal end 102 to a distal end 104. The filter 100 includes a frame 106 having four longitudinal ribs 108 which are individually coplanar with a filter axis, and one circumferential rib 110 which also is the proximal end rib 112. The four longitudinal ribs 108 converge to join each other at the distal end 104 of the filter 100. The filter 100 further includes four screens 118 of non-woven sheet resin material suspended between and integrally molded with the longitudinal ribs 108 and the circumferential ribs 110. The longitudinal ribs 108 are spaced 90° apart so that each screen 118 substantially forms a quarter-section 120 of a cone. Again, each screen 118 has the same qualities as the screens 16 of the first preferred filter 10 shown in FIGS. 1, 2, and 3.

The unitary injection molded filter may be used in many different ways depending upon its shape. For example, all of the preferred filters shown in FIGS. 1, 4, 6, and 8 may be used as in-line filters for separating particulate matter from a fluid which is being pumped through a pipe. With the second 40, third 70 and fourth 100 preferred filter, the fluid is generally passed into the filter through the open proximal ends 42, 72, and 102 of these filters and out through their holes 22. The fourth preferred filter 100 shown in FIG. 8 could possibly be used as a filter within a funnel shaped instrument such as a funneled coffee-maker.

The second, third, and fourth preferred filters, 40, 70, and 100 are somewhat more difficult to mold because they are three dimensional in shape. These three dimensionally shaped filters require an inner core mold cavity and normally four outer body mold cavities which have the projections for the formation of the plurality of holes through the filter screen. The four outer sections of the mold cavity would reciprocate toward the inner core to open and close the mold. The taper of the holes 22 again facilitates withdrawal of the mold cavity projections from the product in the mold without damaging it. It would also be possible, using this technique to actually omit the ribs in the filter design to thereby increase slightly filter size. The unitary molded filter would still be somewhat rigid, because the sheet thermoplastic resin material, even though perforated, is more rigid than many woven sheets.

The unitary molded filter of the present invention offers significant advantages over prior art filters using woven fabrics insert molded in a thermoplastic frame. Because the sheet material of this filter is molded, the hole size does not vary, but remains firmly constant. Although the holes shown in all embodiments are round, they may also be square, rectangular, triangular, etc. Thus, the term "frusto-conical" is used in its broader sense wherein the frustrum can have a base of substantially any shape. Since there is no need to insert a mesh in a mold cavity, the production of the filters is much more economical and efficient. Also since the filter is unitary molded as a single piece, a wide variety of geometric shapes and sizes is possible. Also because it is injection molded as a unitary piece, the filter comes out of the mold shaped and ready for use without the need for further processing. The fact that the screen of the filter of the present invention is smooth and flat, except for the holes, is also an advantage. This feature allows the filter to be easily cleaned, if it should become clogged, by wiping or rinsing to remove trapped particles from its surface.

It is understood that the invention is not confined to the particular construction, arrangement and embodiments herein illustrated and described, but embraces such modified forms thereof as come within the scope of the following claims.

What is claimed is:

1. A unitary injection molded filter for separating small particulate matter from a fluid comprising:
   (a) a rigid frame of synthetic resin material to provide a rigid shape to the filter; and
   (b) at least one screen of non-woven sheet synthetic resin material with opposed smooth side surfaces made integral with the frame and having formed therethrough a plurality of holes extending between the opposed side surfaces of the sheet so as to form fluid passages therethrough, each hole having a minimum transverse width within the range of approximately 0.0005 inches to 0.01 inches, wherein the filter is formed by a process comprising injecting a quantity of thermoplastic resin material into a mold to simultaneously form the frame and the screen of the filter.

2. The unitary injection molded filter specified in claim 1 wherein the filter is substantially cylindrical in shape with a proximal and a distal end, the frame including least three longitudinal ribs parallel to a filter axis, and at least two circumferential ribs, one of which is a proximal end rib at the proximal end of the filter, another of which is a distal end rib at the distal end of the filter, and each screen substantially forms a section of a cylinder suspended between the ribs.

3. The unitary injection molded filter specified in claim 2 wherein the frame further includes a distal end cap integrally molded with and joined to the distal end rib closing off the distal end of the filter.

4. The unitary injection molded filter specified in claim 2 wherein there are four longitudinal ribs spaced 90° apart, two circumferential ribs, and four screens, each screen substantially forming a quarter-section of the cylinder.

5. The unitary injection molded filter specified in claim 1 wherein the filter is substantially frustoconical to conical in shape, narrowing from a proximal end to a distal end, the frame including at least one longitudinal rib, and at least one circumferential rib, one circumferential rib being a proximal end rib at the proximal end of the filter, and each screen substantially forms a section of the frustoconical to conical shape, suspended between the ribs.

6. The unitary injection molded filter specified in claim 5 wherein the filter is substantially frustoconical in shape and one of the at least two circumferential ribs is a distal end rib at the distal end of the filter.

7. The unitary injection molded filter specified in claim 6 wherein the frame further includes a distal endcap integrally molded with and joined to the distal end rib closing off the distal end of the filter.

8. The unitary injection molded filter specified in claim 5 wherein the filter is substantially conical in shape and the longitudinal ribs converge to join at the distal end of the filter.

9. The unitary injection molded filter specified in claim 8 wherein there are four longitudinal ribs spaced 90° apart, one circumferential rib and four screens, each screen substantially forming a quarter-section of a cone.

10. The unitary injection molded filter specified in claim 1 wherein each hole has a wall which is continuously tapered inwardly from one planar side surface to the other planar side surface of each screen.

11. The unitary injection molded filter specified in claim 1 wherein each hole has a center which is separated by a distance of 0.010 inches from the centers of adjacent holes.

12. The unitary injection molded filter specified in claim 1 wherein the frame is an annulus in which the screen is suspended.

13. A method of forming a unitary injection molded filter for separating small solid particulate matter from a fluid comprising the steps of:
   (a) injecting a quantity of thermoplastic resin material into a mold which includes at least two mold parts with mold cavity surfaces, and at least one of the mold cavity surfaces including projections formed on it extending to the cavity surface of the opposed mold part for the formation of a plurality of holes through the filter, the mold forming a filter which includes a rigid frame to provide a rigid shape to the filter, and at least one screen of non-woven sheet resin material with opposed smooth side surfaces made integral with the frame and having formed therethrough the holes which extend between the opposed side surfaces of the sheet so as to form fluid passages therethrough, each hole having a minimum transverse width within the range of approximately 0.0005 inches to 0.01 inches, each screen being simultaneously and integrally molded with the frame;
   (b) allowing the formed filter to cool so that it will hold its form; and
   (c) opening the mold cavities and separating the filter from the mold cavities.

14. The method specified in claim 13 wherein the filter is molded so that each hole has a wall which is continuously axially tapered inwardly from one side surface to the other side surface of the screen.

15. The method specified in claim 13 wherein the portion of each mold cavity surface forming the surfaces of the screen is planar except for the projections on the at least one mold cavity surface forming the holes.

16. The method specified in claim 13 wherein the filter is molded so that the frame is an annulus in which the screen is suspended.

17. The method specified in claim 16 wherein the filter is molded so that it is substantially cylindrical in shape with a proximal and distal end, the frame including at least three longitudinal ribs parallel to a filter axis, and at least two circumferential ribs, one of which is a proximal end rib at the proximal end of the filter, another of which is a distal end rib at the distal end of the filter, and each screen substantially forms a section of a cylinder suspended between the ribs.

18. The method specified in claim 13 wherein the filter is molded so that it is substantially frustoconical to conical in shape, narrowing from a proximal end to a distal end, the frame including at least one longitudinal rib, and at least one circumferential rib, one circumferential rib being a proximal end rib at the proximal end of the filter, and each screen substantially forms a section of the frustoconical to conical shape, suspended between the ribs.

19. A mold for forming a unitary injection molded filter for separating small solid particulate matter from a fluid comprising:
   (a) at least one mold part defining a mold cavity surface formed by an engraving process, the surface including projections which project from an otherwise continuous smooth surface formed in the mold part for the formation of a plurality of holes through the filter, the projections having flattened tops and a minimum transverse width within the range of approximately 0.0005 inches to 0.01 inches;
   (b) at least one opposed mold part defining an opposed mold cavity surface including a continuous smooth surface which abuts against the flattened tops of the projections of the other mold for the formation of a plurality of holes through the filter, the mold forming a filter which includes a rigid frame to provide a rigid shape to the filter, and at least one screen of non-woven sheet resin material formed between said continuous surfaces of the mold and made integral with the frame with holes formed by the projections, the holes extending between opposed smooth side surfaces of the sheet so as to form liquid passages therethrough, wherein portions of the mold cavity in which the frame and the screens are formed are interconnected such that resin material can be injected to simultaneously mold the frame and screens.

20. The mold specified in claim 19 wherein the continuous surfaces which form the surfaces of the screen are planar except for the projections for forming the holes.

* * * * *